US006935963B2

(12) United States Patent
Meadows (10) Patent No.: US 6,935,963 B2
(45) Date of Patent: Aug. 30, 2005

(54) SYSTEM AND APPARATUS FOR PROPELLING AND CARRYING A USER WITHIN A CONFINED INTERIOR

(75) Inventor: Joseph Stephen Meadows, Los Angeles, CA (US)

(73) Assignee: One Giant Leap, L.L.C., Los Angeles, CA (US)

( * ) Notice: Subject to any disclaimer, the term of this patent is extended or adjusted under 35 U.S.C. 154(b) by 0 days.

(21) Appl. No.: 10/430,676

(22) Filed: May 7, 2003

(65) Prior Publication Data

US 2004/0002392 A1 Jan. 1, 2004

Related U.S. Application Data

(60) Provisional application No. 60/448,141, filed on Feb. 20, 2003, and provisional application No. 60/377,976, filed on May 7, 2002.

(51) Int. Cl.$^7$ ............................................... A63G 31/12
(52) U.S. Cl. ........................................ 472/134; 244/26
(58) Field of Search .............................. 472/49, 50, 68, 472/133, 134, 130; 244/26, 27, 31, 32, 33

(56) References Cited

U.S. PATENT DOCUMENTS

| | | | | |
|---|---|---|---|---|
| 2,132,908 A | | 10/1938 | Strong | |
| 2,183,594 A | | 12/1939 | Strong | |
| 2,704,192 A | * | 3/1955 | Paul | 244/26 |
| 4,061,293 A | | 12/1977 | Lo | |
| 4,264,311 A | * | 4/1981 | Call et al. | 434/247 |
| 5,391,115 A | * | 2/1995 | Bessey | 472/80 |
| 5,531,644 A | | 7/1996 | Marumo | |
| 6,325,329 B1 | | 12/2001 | Meadows | |

OTHER PUBLICATIONS

Cliff Gromer, "One Of A Kind," Outdoors, Popular Mechanics, Sep. 2000, <www.popularmechanics.com>, 1 page.
Glen Moyer, "Beyond the Gossamer Condor," Talegate, <www.parabounce.com>, 1 page.
Erwin Koch, "Schøner Abfall," Spiegel Reporter, Jul. 2000, Neue Welt/Ein Foto und seine Geschichte, p. 7.
Martin Miller, "Putting a bounce in your step," Los Angeles Times, Lifestyle, Sunday, Aug. 8, 1999, p. 1.
Sports Illustrated, Scorecard, "The Light Stuff," p. 34, Nov. 22, 1999.
AOPA Pilot, Dec. 1999, p. 41.
Geln Moyer, "Ballooning's Newest Thrill Ride," Ballooning, p. 24, <www.bfa.net>.
Joshua Levine, "It's a bird, it's a plane, it's . . . parabounce?," Forbes, Oct. 18, 1999, p. 202.
Los Angeles Times, Monday, Feb. 25, 2002, Salt Lakes City Winter Games, 1 page.
Reporter–Bounce, "I can fly!, Mere mortals can now leap tail buildings in a single bound" <www.parabounce.com>1 page.

* cited by examiner

Primary Examiner—K. T. Nguyen
(74) Attorney, Agent, or Firm—McGuireWoods LLP (57) ABSTRACT

The present invention comprises an inflatable balloon of sufficient volume and buoyancy to allow a human pilot to float above the ground and to glide over the ground within an enclosed area. The balloon incorporates several safety features that permit it to be used for recreation, including a prop-bike to enable the user to propel the balloon.

22 Claims, 10 Drawing Sheets

SYSTEM AND APPARATUS FOR PROPELLING AND CARRYING A USER WITHIN A CONFINED INTERIOR

PRIORITY

The present application claims priority to Provisional Application Ser. No. 60/377,976, filed on May 7, 2002 and Provisional Application Ser. No. 60/448,141, filed on Feb. 20, 2003.

FIELD OF THE INVENTION

This invention relates generally to using balloons filled with helium gas, and more specifically, this invention relates to using helium balloons designed to carry and propel a single person aloft within a confined interior.

BACKGROUND OF THE INVENTION

People have used gas-filled balloons for transportation since the Montgolfier brothers, Joseph Michel and Jacques Etienne, invented the first hot air balloon in 1783. There have been hot air balloons designed to carry a single person. Such a device typically includes a compressed flammable gas tank strapped to the pilot's back and a burner above the pilot's head. The open flame needed for heating the air makes such a device relatively dangerous to use, however. Additionally, the burning gas pollutes the atmosphere, and the burner is quite noisy when in use. Moreover, the equipment associated with a single-person hot air balloon is prohibitively expensive to acquire and requires a truck to transport. And the diameter of a balloon needed to carry a single person is nearly 40 feet, making the balloon difficult to maneuver, especially in more crowded airspace. All of these disadvantages make such a device relatively undesirable and wholly impractical for widespread use by the public.

A helium-filled balloon overcomes these disadvantages. Helium gas is plentiful, non-flammable (and therefore safe) and environmentally friendly. Without a gas tank and a burner, a helium balloon is less expensive to acquire, and a deflated balloon can be transported by the pilot inside a passenger car. Finally, a helium balloon one-eighth the volume of a hot air balloon will lift the same weight so the diameter of the balloon for carrying a single person needs only to be 18–20 feet.

Even with these comparative advantages, however, helium balloons designed to carry a single person have seen only limited and obscure use in the past. In the early 1900s, people began using rubber balloons filled with helium gas for recreation. In this sport, men would hang precariously from nets strung over several helium balloons and race each other across large open areas as spectators placed bets on which pilot would be the winner. Perhaps because of the potential danger associated with a balloon puncture or a loss of grip, this sport never gained much popularity.

As recently as 1985, the movie "Leap of Faith" starring Steve Martin featured an untethered, one-man helium balloon. In the movie, the character played by Martin "flew" the balloon to rescue a small child from a dangerous balloon. What the movie does not show is the fact that an accident occurred during the filming. The balloon used in the production was not made from a rip-stop material. Rather, it consisted of a single layer of fabric and the attachment points for the harness used by the pilot were essentially glued to the underside of the balloon. As a result, the balloon tore as it hit the wall of the rock quarry where the girl in the film was to be rescued, and the stuntman piloting the balloon suffered a broken back. The production company destroyed the unsafe, poorly constructed balloon after the filming had concluded.

In 1995, U.S. Pat. No. 5,391,115 issued for an invention entitled "Low Gravity Jumping Apparatus." This invention discloses a helium balloon for providing a buoyant upward force but it does not provide any features for making the balloon safe for recreational use. Instead, the invention focuses on the design of a special harness and frame combination that allows the rider to rotate his or her body in a horizontal or vertical axis. The use of such a device only increases the risk associated with the activity.

Moreover, use of helium balloons is typically subject to the conditions of the weather. High winds, rain and other conditions may prevent the use of a helium balloon, or may curtail the enjoyment of the experience for the riders. Further, the dependence upon wind for the movement of the helium balloon may limit its use, as appropriate landing areas may not be available due to the direction of the wind.

Other drawbacks may also be present.

SUMMARY OF THE INVENTION

Accordingly, one aspect of the invention is to address one or more of the drawbacks set forth above.

By way of an exemplary embodiment of the invention, a system for allowing a user to float and glide for entertainment comprises an enclosed area, a device for allowing a user to float and glide within the enclosed area, where the device includes an inflatable balloon having sufficient volume to carry a pilot aloft when it is inflated with a gas, a plurality of lines secured to one another at one end and operatively connected to the balloon, a parachute harness for the user and a fastening means for securing the harness to the free end of the test lines.

According to a further exemplary embodiment of the invention, a device for carrying and propelling a user comprises an inflatable balloon having sufficient volume to carry a user aloft when it is inflated with a gas, a plurality of lines secured to one another at one end and operatively connected to the balloon, a ring attached to the plurality of lines and a support mount rotationally attached to the ring, the support mount having mounted thereto a propeller for propelling the device, a pedal assembly operatively connected to the propeller for enabling the user to drive the propeller and a steering assembly for enabling a user to steer the device.

According to another exemplary embodiment of the invention, a system for allowing a user to float and glide for entertainment comprises an enclosed area, a device for allowing a user to float and glide within the enclosed area, where the device includes, an inflatable balloon having sufficient volume to carry a pilot aloft when it is inflated with a gas, a plurality of lines secured to one another at one end and operatively connected to the balloon, a ring attached to the plurality of lines and a support mount rotationally attached to the ring, the support mount having mounted thereto a propeller for propelling the device, a pedal assembly operatively connected to the propeller for enabling the user to drive the propeller and a steering assembly for enabling a user to steer the device.

DETAILED DESCRIPTION OF THE INVENTION

A system and apparatus process for carrying and propelling a single person aloft in a helium balloon within a confined interior. Various aspects and components of this system and process are described below. While the present invention is described in terms of a helium balloon (hereinafter also referred to as a "balloon"), a propeller driven device and an inflated dome, it is recognized that other apparatus that achieve these results may also be used.

Figure 6:
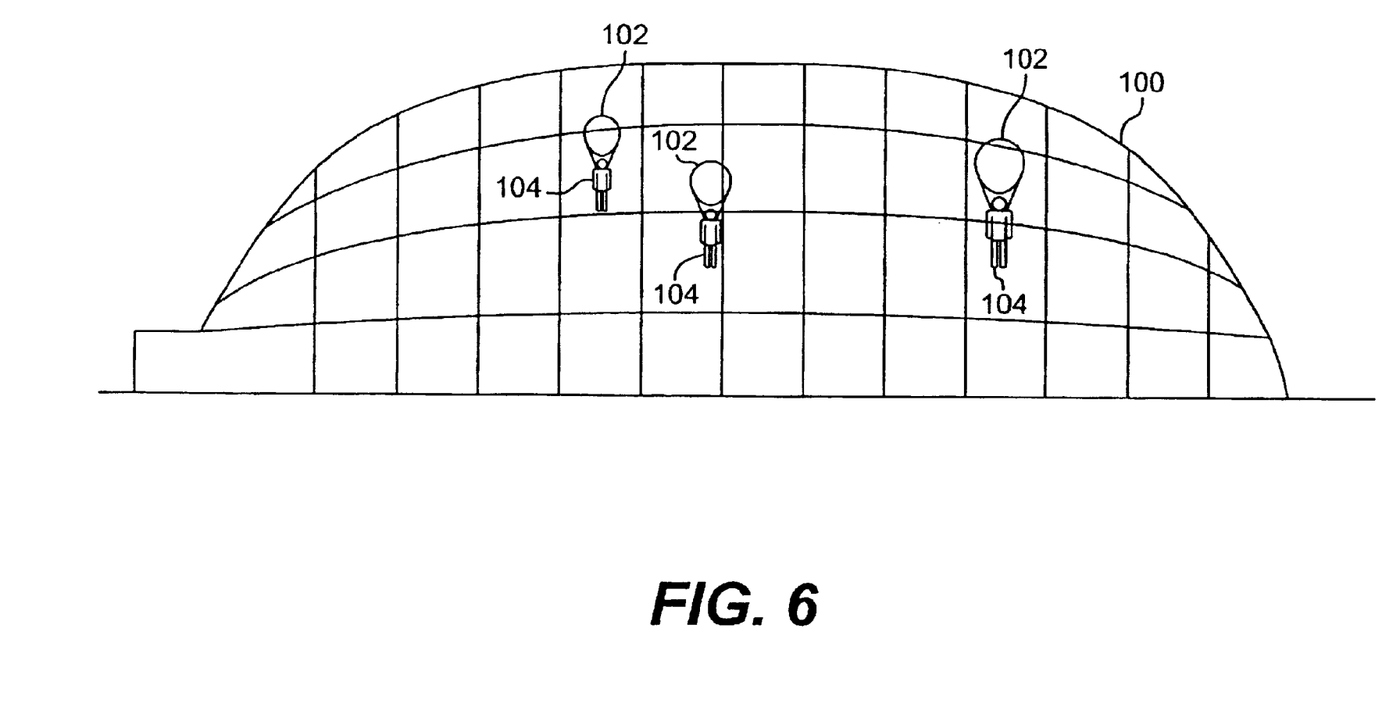
FIG. 6 is an illustration of a dome using a balloon according to an embodiment of the invention.

According to an embodiment of the invention, a dome and prop-bike provide a recreational area for using a helium balloon. The dome provides an enclosure for using the helium balloon, thereby preventing the balloon from flying off. FIG. 6 illustrates a dome providing a recreational area for using a helium balloon according to an embodiment of the invention. A dome 100 provides an interior for gas filled balloons 102, such as helium filled balloons, to carry riders 104. As illustrated in FIG. 6, a plurality of balloon 102 with riders 104 may be used within dome 100. Balloons 102 and riders 104 may be equipped to allow contact with other balloons 102 and riders 104, such as padding, reinforced materials, and the like. Although an embodiment of the dome 100 provides the use of an air supported structure, such as by positive air pressure, other embodiments may also be used. The dome 100 provides an enclosure to allow users 104 of the helium balloon 102 to bounce off the walls and ceilings of the structure, as well as bounce their balloon off the balloons of other users. The materials used in dome 100 should enable the balloons 102 to bounce without damaging the balloons 102. By way of example, for balloons 102 made of nylon or similar type material, the inner walls and ceiling of the dome 100 may require padding and the like, with sharp points and edges covered to prevent the balloons from snagging and/or ripping on them. Stronger material used for the balloons 100 may require less padding on the interior of the dome. According to an embodiment of the invention, the interior of the dome is padded sufficiently to prevent damage and snagging of the balloon.

The dome may also be of sufficient size to enable one or more users to operate a balloon within the dome. By way of example, a dome may cover approximately 40,000 square feet or more, with a height of about 100 feet. Such a structure would enable a number of users to jump within the dome, bouncing off walls and each other's balloon. By way of this example, existing domes, such as those used for football, baseball and other sports, may be used. Other structure sizes may also be used.

According to another embodiment of the invention, a mechanical device may be used to propel users of a balloon. This device may be used to propel users of a balloon within a dome, as opposed to just propulsion from the user jumping. According to an embodiment of the invention, a bicycle type mechanism, such as the prop-bike, may be used to propel a user. According to an embodiment of the invention, a prop-bike 202 is illustrated in FIGS. 7–10. Prop-bike 202 is attached to a helium balloon 200 through lines 216 attached to a line mount structure, such as ring 214. A swivel suspension 218 attaches ring 214 to a support mount, such as bottom fairing 210 through attachment bar 219. Swivel suspension 218 allows the user to rotate the prop-bike 202 relative to ring 214 and balloon 200. Swivel suspension 218 may be any conventional device for rotating, such as a ball bearing joint, or the like.

Figure 7:
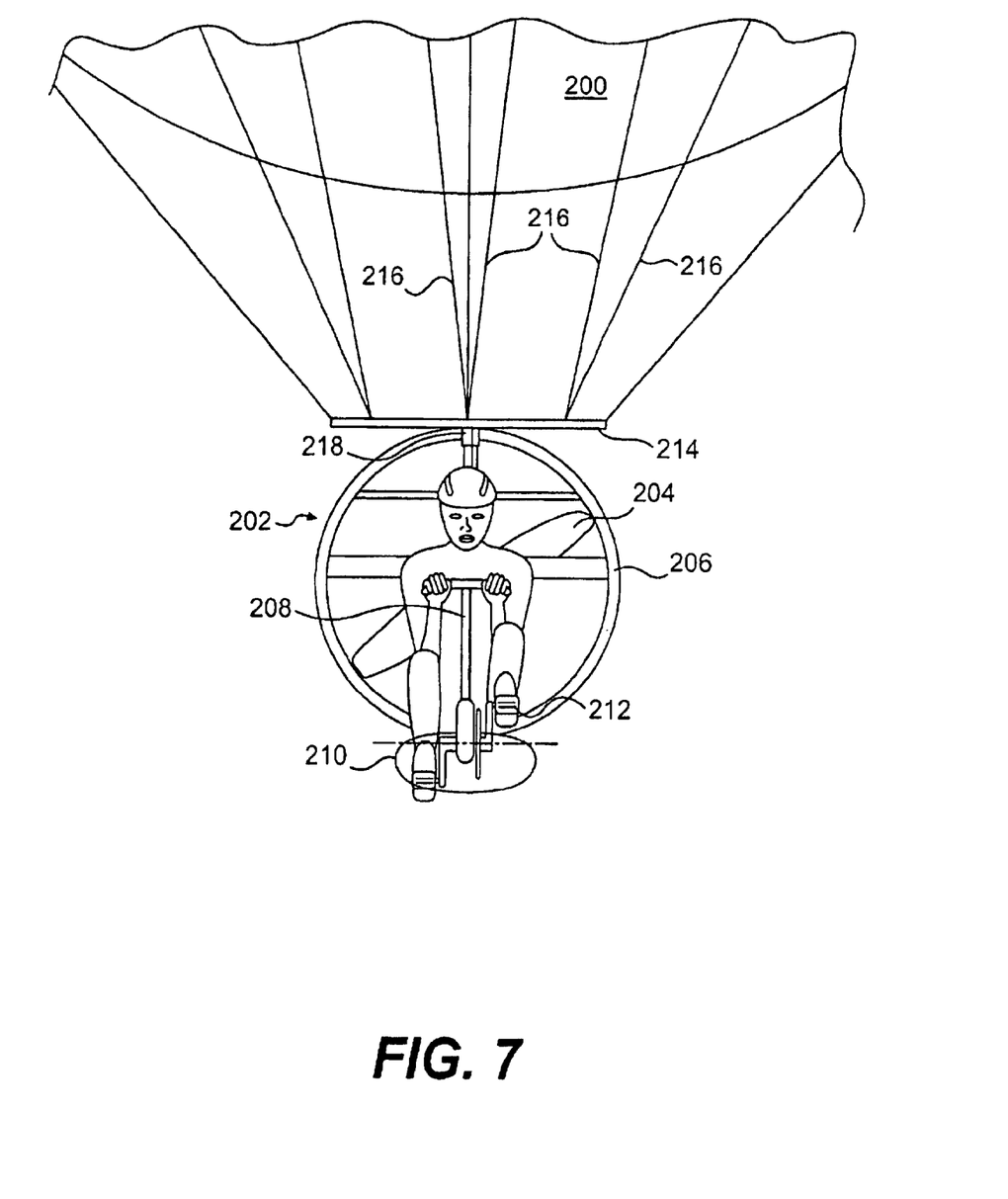
FIG. 7 illustrates a head on view of a prop-bike according to an embodiment of the invention.
Figure 8:
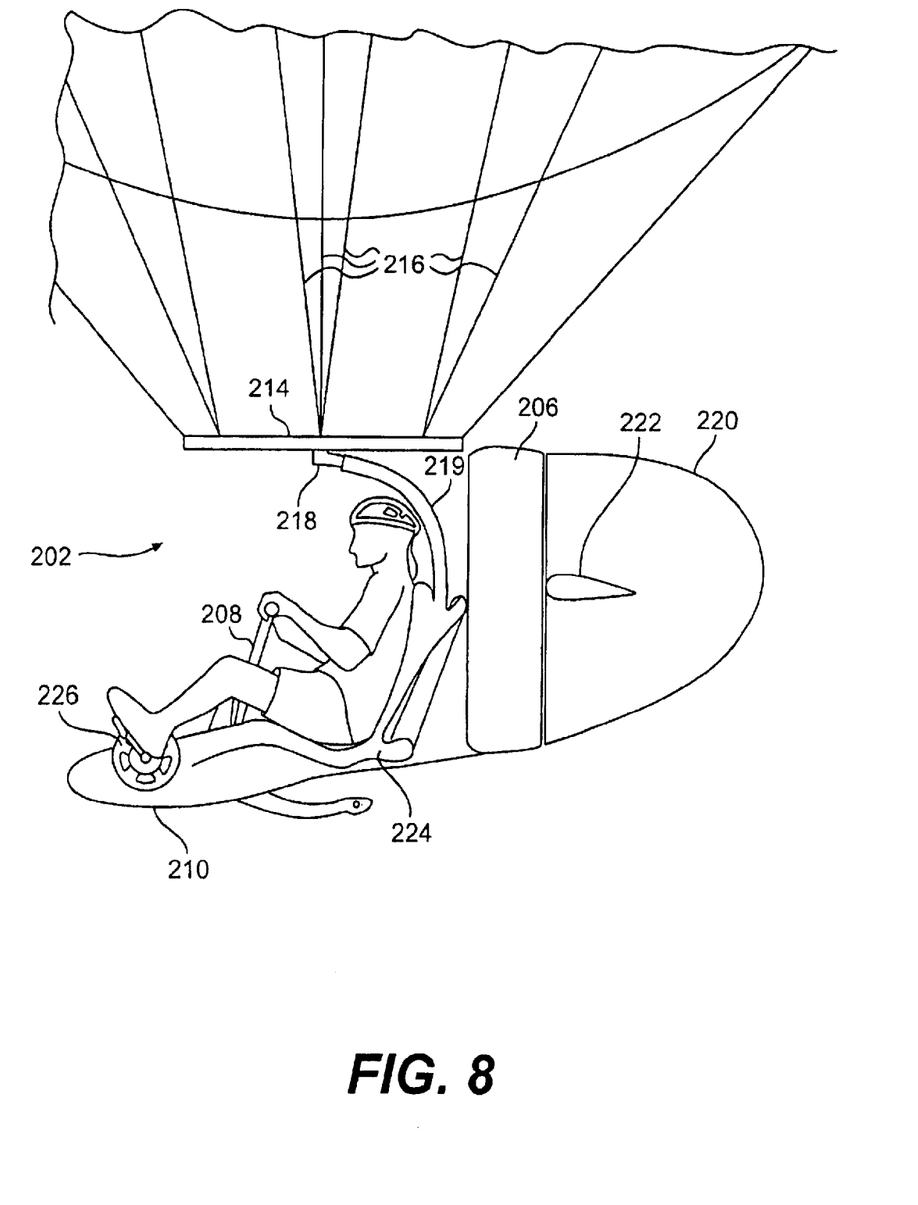
FIG. 8 illustrates a side view of a prop-bike according to an embodiment of the invention.

One or more propellers 204 located with in a shroud 206 are used to propel the prop-bike 202. The user sits on a bicycle type seat 224, where the mechanism has a control column 208, such as a steering wheel or bicycle handles. A bottom fairing 210 is attached at the bottom. According to an embodiment of the invention, bottom fairing 210 may used to protect moving parts, as well as to provide a platform for landing the prop-bike 202 and enabling the rider to get on and off. Control column 208 is operatively connected to a ruder 220 and elevators 222.

Pedals 212 are attached to gear 226 which is operatively connected to one or more propellers 204. As the user pedals the mechanism, the propellers 204 turn, thereby moving the balloon 200 and the user. The user may then steer with the rudder 220 and elevators 222, directing the path of the balloon 200. Other mechanisms for propelling the balloon, such as compressed gas, fans, or other propulsion mechanisms may also be used. As will be apparent to one of ordinary skill in the art, it will be necessary to adjust the size of the balloon and the amount of the lift required to account for the weight of the prop bike or other propelling mechanism (e.g., compressed gas, electric fan, motorized fan, etc.) as well as the weight of the user. Further, it is understood that light weight materials, such as plastic, aluminum, or other light weight material.

Figure 10:
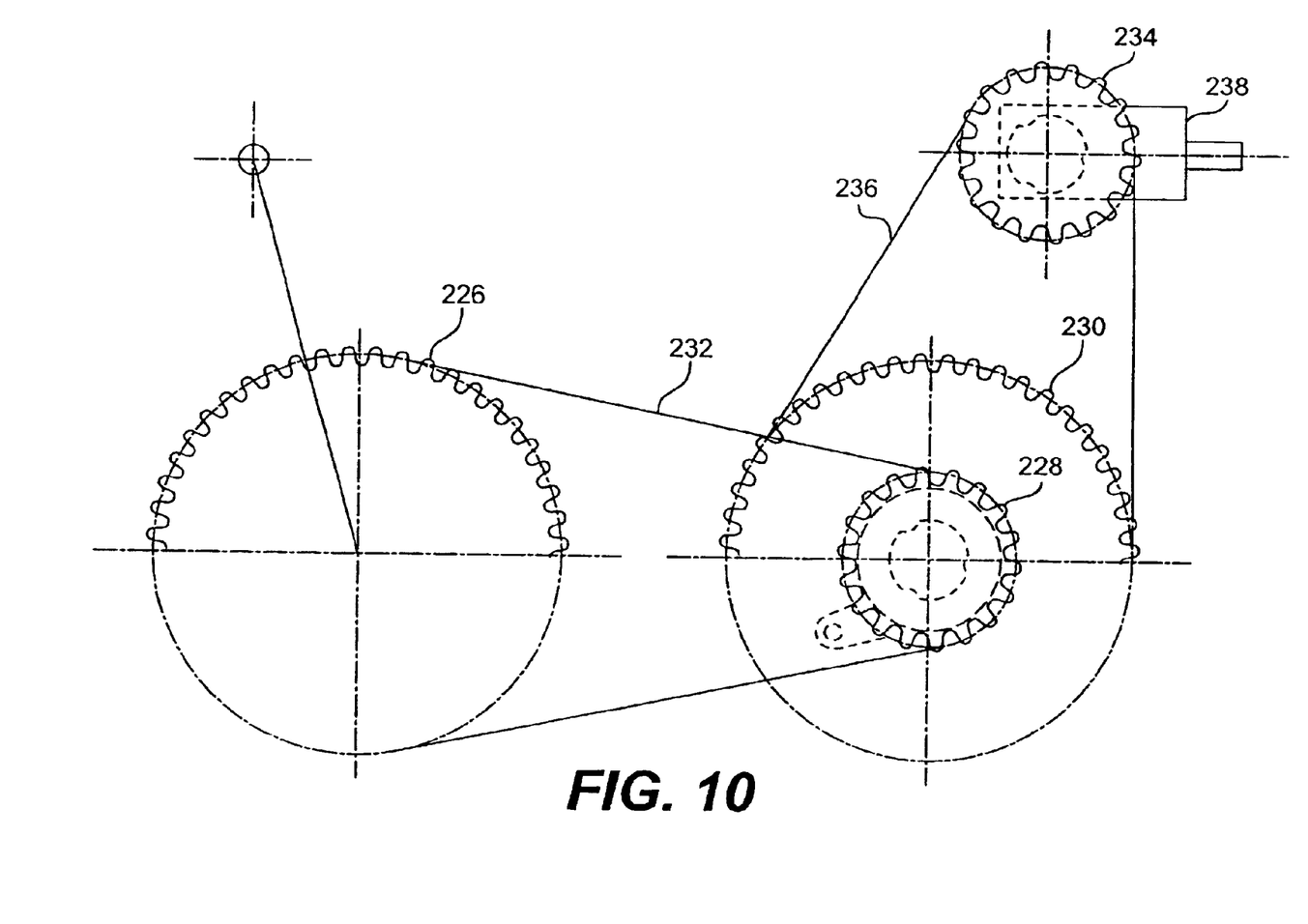
FIG. 10 illustrates a gear configuration for a prop-bike according to an embodiment of the invention.

In the embodiment of the prop bike, a seat 224 for a user is provided with pedals 212 in a recumbent position. As illustrated in FIG. 10, chain 232 is interacts with gear 226, which is connected to pedals 212. According to the embodiment illustrated in FIG. 10, chain 232 interacts to turn gear 228 which is attached to gear 230. Chain 236 interacts with gear 230 to turn gear 234. Gear 234 is connected to and rotates drive 238, which is connected to propeller 206 for moving the prop bike. According to an embodiment of the invention, a propeller tilt and turn control is provided to the user for to control the direction of the prop bike. The control enables the user to tilt the propeller up or down a predetermined amount (e.g. plus or minus ten degrees), as well as tilting the propeller left or right a predetermined amount (e.g. plus or minus ten degrees). This allows the user to control the direction of the flight, either up, down, right, left or some combination thereof. Based on the pedal to gear ratio on the propeller, it may necessary for the prop bike to be used only within a dome, or to be used outside with little or no wind.

Figure 9:
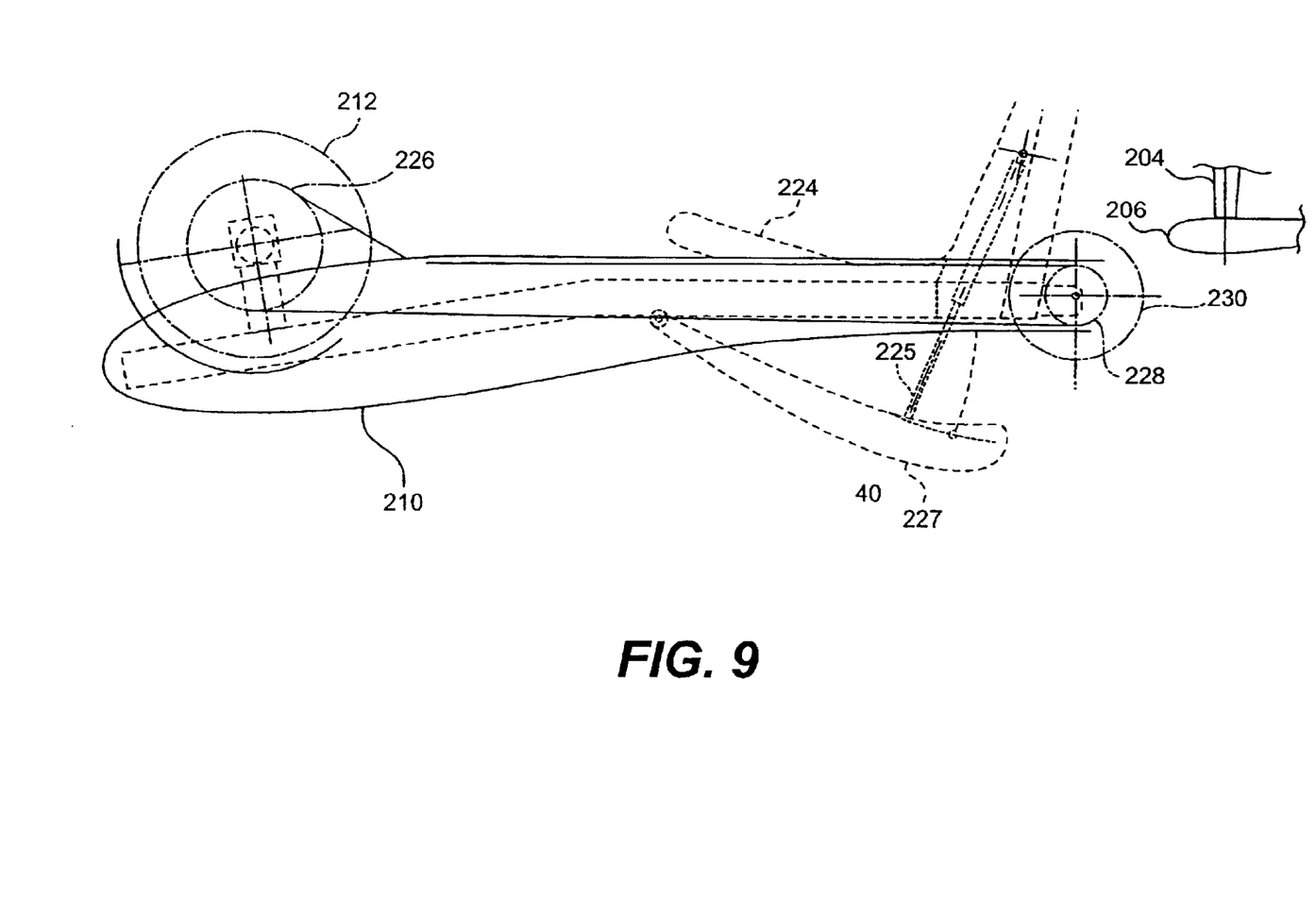
FIG. 9 illustrates a partial view of a bottom fairing of a prop-bike according to an embodiment of the invention.

According to an embodiment of the invention, the chain assembly and propeller control are surrounded by a protective casing, such as a light-weight plastic shell. As illustrated in FIG. 9, the protective casing, such as bottom fairing 210, serves to support gear 226 and pedal 212 in the front, where the user can operate the pedal 212. Seat 224 is further supported by bottom fairing 210, while gear 228 and gear 230 are supported at the rear of bottom fairing 210. According to an embodiment of the invention, a shock 225 is attached at one end to bottom fairing 210 and attached at the other end to landing pad 227. When the prop-bike is landed, shock 225 absorbs the ground impact when landing pad 227 contacts the ground or other landing surface. Other devices for landing, such as skid pads, or wheels may also be used.

As described above, the prop bike 202 is connected to the balloon 200 by a tether system. For purposes of balance, it may be desirable to use at least three tethers or lines 216 to attach the prop bike to the balloon. Other configurations for the prop bike may also be used.

Figure 1:
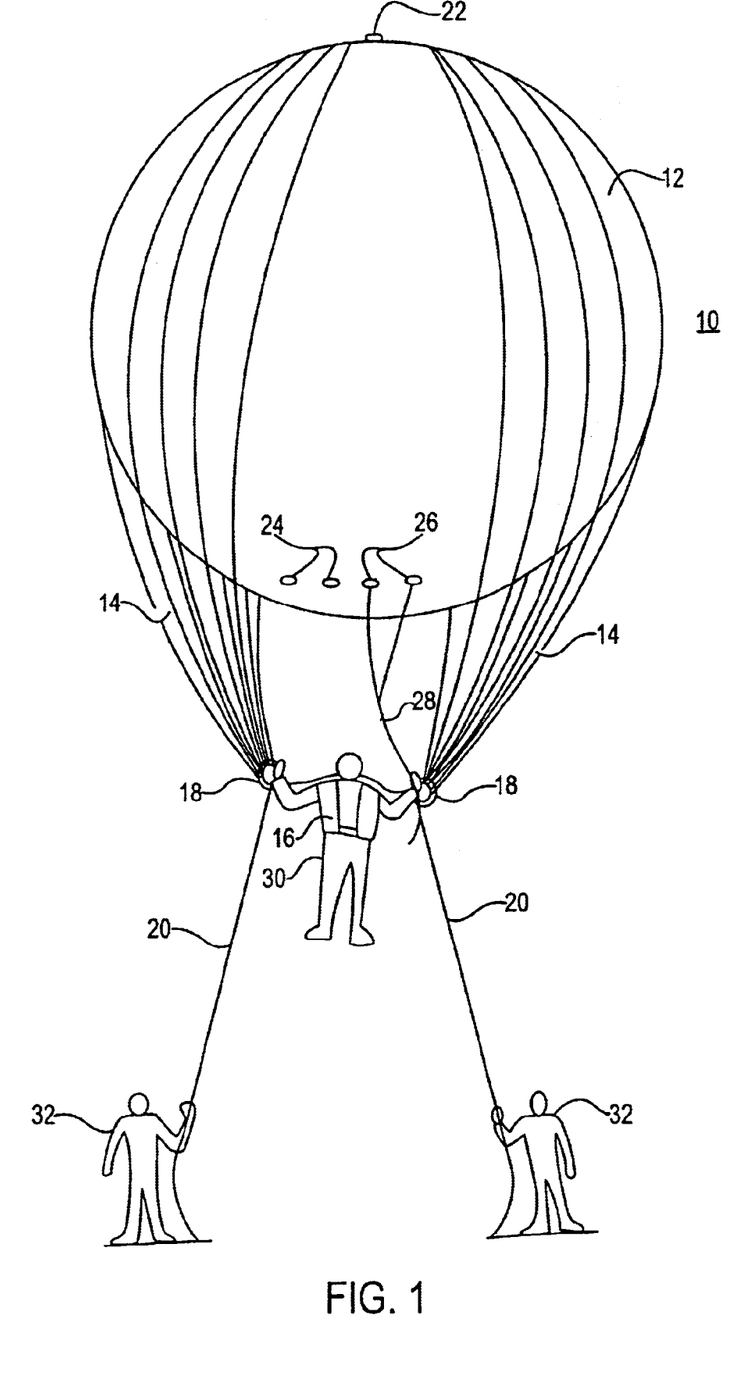
FIG. 1 illustrates is an view of a helium balloon according to an embodiment of the invention.

According to an embodiment of the invention, one or more balloons with a user (or users) for each balloon, may be used within a dome 100 as described in FIG. 6. FIG. 1 illustrates device for a user and a balloon to be used within a dome 100 according to an embodiment of the present invention. Device 10 comprises a balloon 12 with a plurality of test lines 14 secured to one another at one end and longitudinally disposed over the balloon 12. In an embodiment of the invention, there may be 16 continuous, 2000-lb test Spectra® lines, but the number used may vary with depending on the strength of the lines used. The test lines 14 are connected at the free end to a conventional parachute harness 16 by suitable fastening means 18, such as for example, locking carabiners.

According to an embodiment of the invention tether lines 20 may be used which are also secured to the fastening means 18 at one end. These tether lines will be of sufficient length to permit the balloon to float up to a desired gliding height, and yet keep the balloon moored to the ground. It is recognized that use of device 10 in a dome may be done without use of tether lines 20.

A release valve 22 at the top of the balloon permits rapid deflation of the balloon after use. The balloon also has a plurality of fill valves 24, preferably two, and bleed-off valves 26, preferably three. The bleed-off valves 26 permit a pilot to effect a controlled release of helium gas in the event the balloon floats away or uncontrollably. The pilot operates the bleed-off valves 26 using a tug line 28 operatively connected to the valves.

FIG. 1 shows the invention 10 in use, with a pilot 30 strapped in the harness and two "ground crew" members 32 holding on to the tether lines. To ascend in the balloon, the pilot pushes off the ground with his or her legs, thereby propelling himself or herself upward. The resulting force, coupled with the buoyancy of the balloon, is sufficient to overcome the effects of gravity on the balloon and the pilot. Both the ascension and descension are gradual, however.

Figure 2:
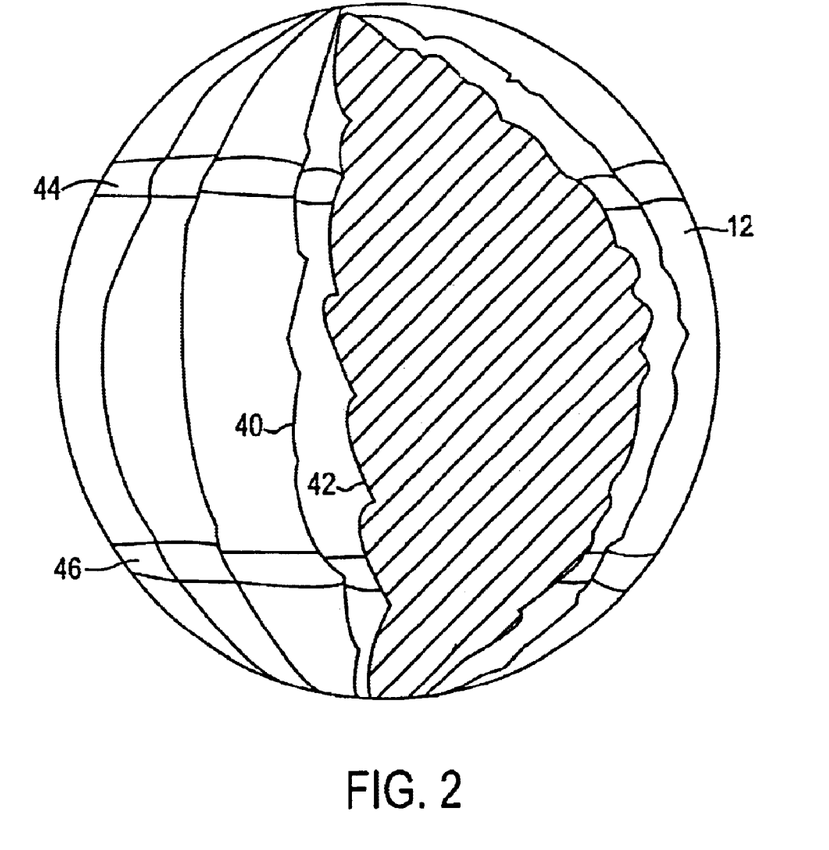
FIG. 2 is a partial cut-away view of the balloon according to an embodiment of the invention.

As seen in FIG. 2, the balloon 12 is preferably constructed from two layers of rip-stop nylon 40 and 42. The individual panels are seamed together using heat. The balloon 12 is preferably about 20 feet in diameter and holds approximately 5,500 cubic feet of helium. According to an embodiment of the invention, the device, when deflated, weighs about 80 pounds. The entire rig for the invention may then be stowed away in a three-foot by three-foot sail bag.

Figure 3:
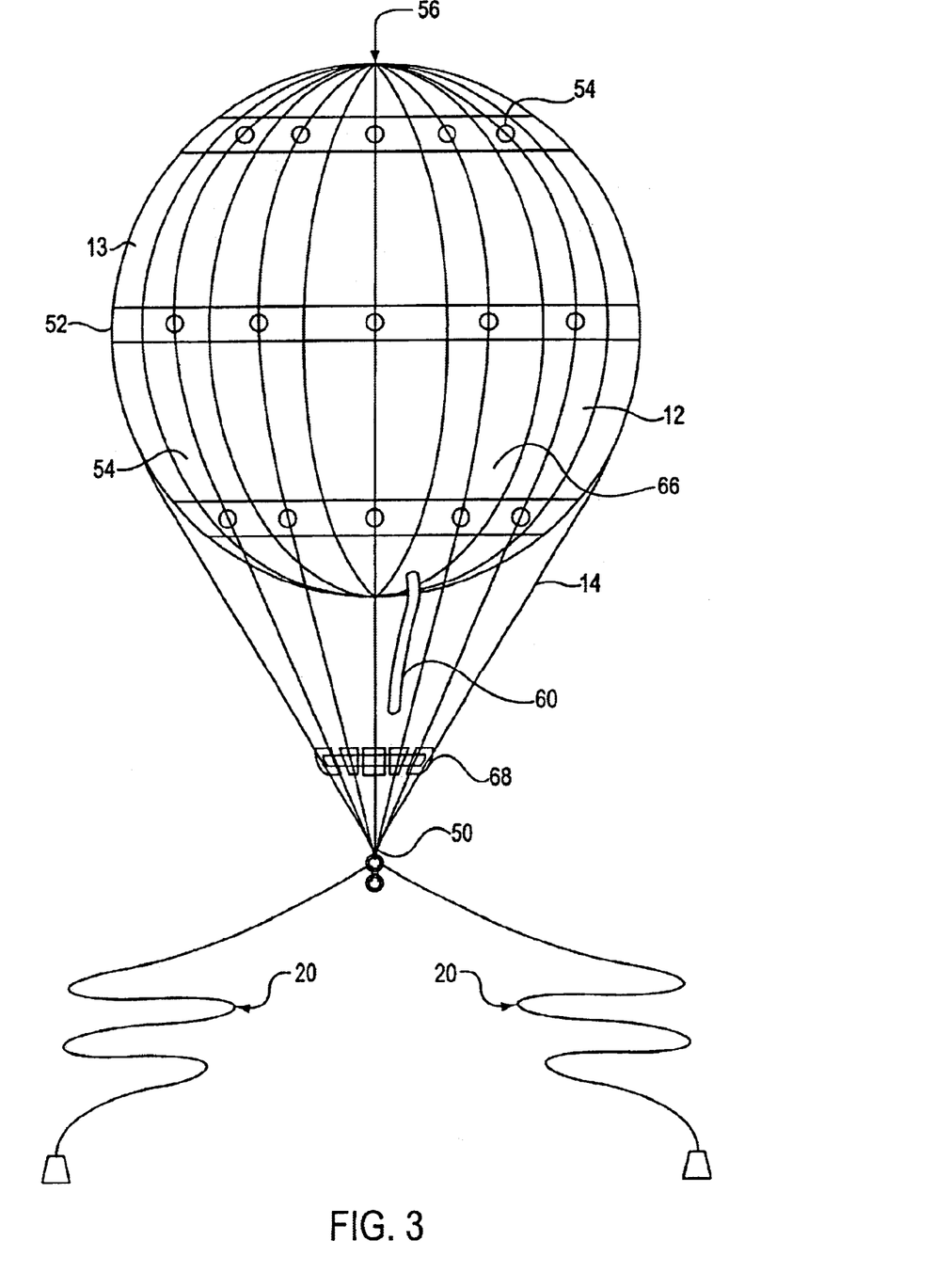
FIG. 3 is a side view of another embodiment of the balloon according to an embodiment of the invention.
Figure 4:
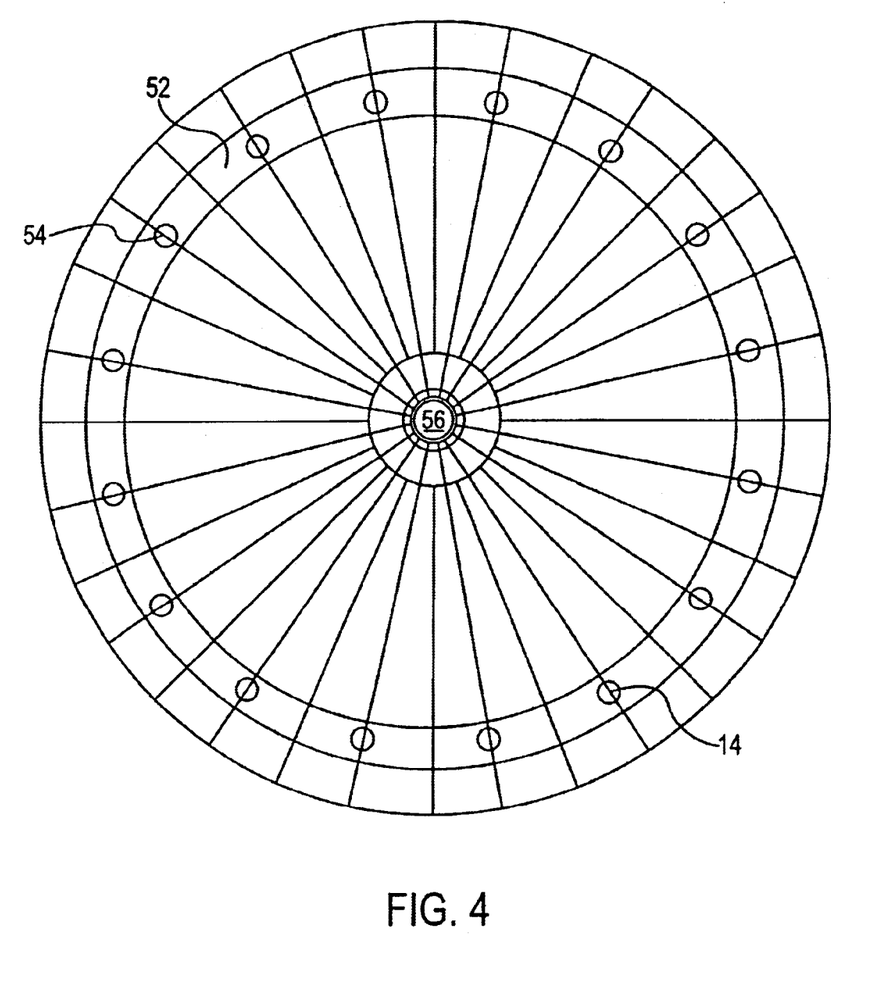
FIG. 4 is a top view of the balloon according to an embodiment of the invention.
Figure 5:
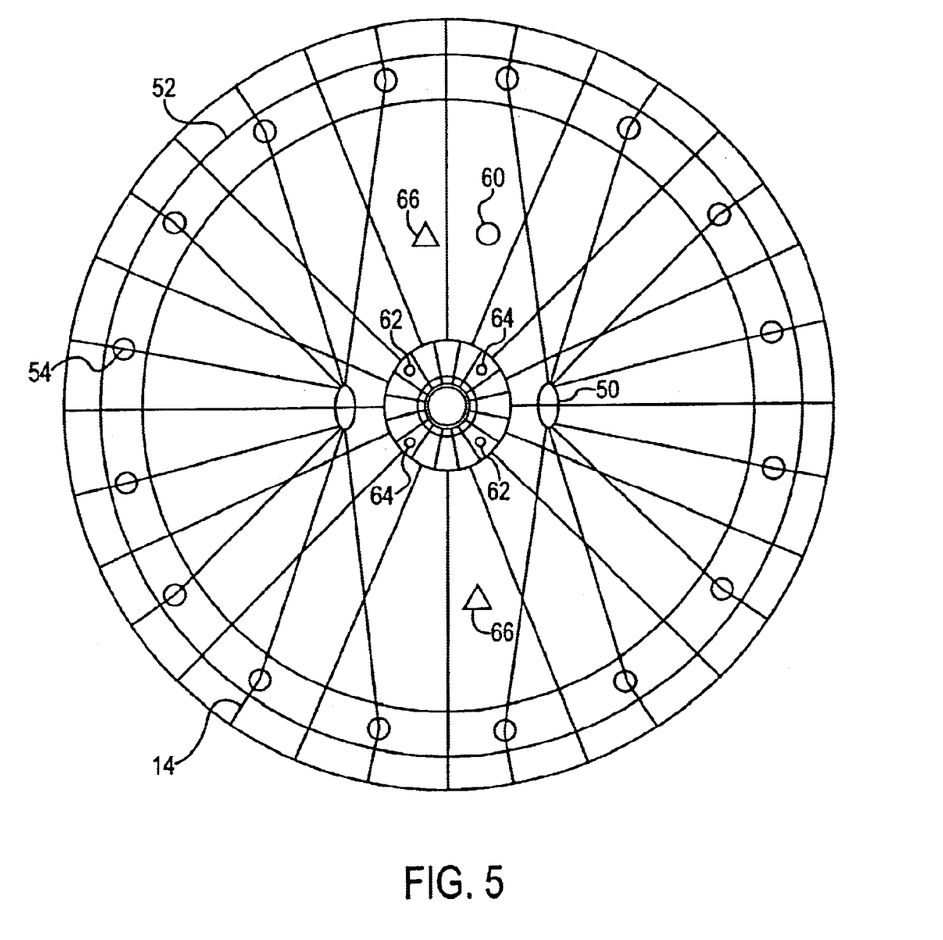
FIG. 5 is a bottom view of the balloon according to an embodiment of the invention.

FIGS. 3–5 illustrate another embodiment of the invention. Looking at FIG. 3 first, the invention 10 again comprises a balloon 12 with a plurality of test lines 14 longitudinally disposed over the balloon 12. The skin of the balloon 12 may be made from a polyurethane-coated nylon with overlapping seams 13. Again, there are may be 16 continuous, 2000-lb test Spectra® lines, but the number used may vary with depending on the strength of the lines used. Test lines 14 may be attached to load patches on the balloon, where the load patches may be attached by glue or other manner of attachment. By way of example, the test lines 14 are attached via load patches which are glues and/or heat-seamed over each test lines 14. In this example, there sixteen test lines 14 are used. However, it is understood that more or fewer test lines 14 may be used, such as eight test lines 14. By way of another example, half of the test lines 14 longitudinally disposed over one hemisphere of the balloon 12 are stitched together at their free ends around a steel ring 50. The other half of the test lines 14 are stitched together at their free ends around another steel ring 50, as seen in FIG. 5.

Alternatively, the interior of the balloon 12 is reinforced with a plurality of nylon battens 52 that latitudinally encircle the balloon 12. There are preferably three battens 52, as seen in FIG. 3. On the exterior of the balloon 12 and distributed along the latitudinal positions of the battens 52 are a plurality of guides 54 for keeping the test lines 14 positioned in even distribution around the balloon 12. The number of guides 54 will depend upon the number of test lines 14 and the number of battens 52; if there are 16 test lines 14 and three battens 52, as in the preferred embodiment, then there will be 48 guides 54. The test lines 14 are secured together at the top of the balloon 12 with two steel rings 56, as also seen in FIG. 4. The rings 56 are stacked one on top of the other. Half of the test lines 14 are secured to one ring 56 and the other half of the lines 14 to the other ring 56, in alternating order. In other words, the two test lines 14 to the immediate right and left of a third test line 14 will be secured to a different ring 56 from that for the third test line. The rings 56 are secured to the balloon 12 with nylon line or webbing (not shown).

The balloon 12 has a deflation zipper 58, as seen in FIG. 3, for complete deflation. There is a hose 60 for assisting with inflation and deflation of the balloon. The balloon has two intake ports 62, each with rubber stopper and cap, and two purge valves 64, each with a pull line, as seen in FIG. 5. There is also an emergency peel-off patch 66 covering a grommet (not shown). When the invention is in use, a pull line is secured to the grommet. The pilot can deflate the balloon quickly by pulling out the grommet. Alternatively, monsun values may be used in place of rubber stoppers and one peel-off zipper is used for deflation.

If the invention will be used by more than one pilot, then canvas bags 68 of varying weights may be attached to a metal ring or belt attached to the test lines 14, as seen in FIG. 3, to compensate for the difference in weight between pilots. The tether lines 20 are attached to the test lines 14 through the use of steel rings and locking carabiners (not shown). If a "ground crew" is used to hold on to the tether lines 20, the tether lines can be strapped to them using harnesses (not shown).

Various additional modifications of the invention described herein will occur to those skilled in the art. All such variations and deviations which basically rely on the teachings through which this invention has advanced the art are properly considered within the scope of this invention and equivalents thereof, as described herein and claimed in the appended claims.

Other embodiments, uses and advantages of the present invention will be apparent to those skilled in the art from consideration of the specification and practice of the invention disclosed herein. The specification and examples should be considered exemplary only. The intended scope of the invention is only limited by the claims appended hereto.

While the invention has been particularly shown and described within the framework of a helium balloon it will be appreciated that variations and modifications can be effected by a person of ordinary skill in the art without departing from the scope of the invention. For example, one of ordinary skill in the art will recognize that other gas filled balloons may be used to effectuate the present invention. Further, any device which is lighter than the surrounding air may be used.

What is claimed is:

1. A system for allowing a user to float and glide for entertainment, the system comprising:
    an enclosed area;
    a device for allowing a user to float and glide within the enclosed area, where the device includes:
        an inflatable balloon having sufficient volume to carry a pilot aloft when it is inflated with a gas;
        a plurality of lines secured to one another at one end and operatively connected to the balloon;
        a parachute harness for the user; and
        a fastening means for securing the harness to a free end of a test lines.

2. The system according to claim 1, wherein the balloon comprises a layer of polyurethane-coated nylon.

3. The system according to claim 1, wherein a deflation zipper is used to deflate the balloon.

4. The system according to claim 1, wherein the lines are secured to one another at one end by means of at least one ring.

5. The system according to claim 1, wherein the fastening means comprises a locking carabiner.

6. The system according to claim 1, where the enclosed area is a dome.

7. The system according to claim 6, where the dome is a positive air-pressure dome.

8. A device for carrying and propelling a user comprising:
    an inflatable balloon having sufficient volume to carry a user aloft when it is inflated with a gas;
    a plurality of lines secured to one another at one end and operatively connected to the balloon;
    a ring attached to the plurality of lines; and
    a support mount rotationally attached to the ring, the support mount having mounted thereto:
        a) a propeller having a shroud for propelling the device;
        b) a pedal assembly operatively connected to the propeller for enabling the user to drive the propeller; and
        c) a steering assembly for enabling a user to steer the device.

9. The device according to claim 8, where the pedal assembly further comprises a gear assembly having at plurality of gears and at least one chain which operatively connect the pedal to the propeller.

10. The device according to claim 8, wherein the support mount further has mounted thereto at least one rudder and at least one elevator operatively connected to the steering assembly.

11. The device according to claim 8, wherein the support mount further has mounted thereto a seat for the user.

12. The device according to claim 8, wherein the balloon comprises a layer of polyurethane-coated nylon.

13. A system for allowing a user to float and glide for entertainment, the system comprising:
    an enclosed area;
    a device for allowing a user to float and glide within the enclosed area, where the device includes:
        an inflatable balloon having sufficient volume to carry a pilot aloft when it is inflated with a gas;
        a plurality of lines secured to one another at one end and operatively connected to the balloon;
        a ring attached to the plurality of lines; and
        a support mount rotationally attached to the ring, the support mount having mounted thereto:
            a) a propeller having a shroud for propelling the device;
            b) a pedal assembly operatively connected to the propeller for enabling the user to drive the propeller; and
            c) a steering assembly for enabling a user to steer the device.

14. The system according to claim 13, wherein the balloon comprises a layer of polyurethane-coated nylon.

15. The system according to claim 13, wherein the lines are secured to one another at one end by means of at least one ring.

16. The system according to claim 13, where the enclosed area is a dome.

17. The system according to claim 16, where the dome is a positive air-pressure dome.

18. The system according to claim 13, where the pedal assembly further comprises a gear assembly having at plurality of gears and at least one chain which operatively connect the pedal to the propeller.

19. The system according to claim 13, wherein the support mount further has mounted thereto at least one rudder and at least one elevator operatively connected to the steering assembly.

20. The system according to claim 13, wherein the support mount further has mounted thereto a seat for the user.

21. A device for carrying and propelling a user comprising:
    an inflatable balloon having sufficient volume to carry a user aloft when it is inflated with a gas;
    a plurality of lines secured to one another at one end and operatively connected to the balloon;
    a ring attached to the plurality of lines; and
    a support mount rotationally attached to the ring, the support mount having mounted thereto:
        a) a propeller for propelling the device;
        b) a pedal assembly operatively connected to the propeller for enabling the user to drive the propeller;
        c) a steering assembly for enabling a user to steer the device; and
        d) at least one rudder and at least one elevator operatively connected to the steering assembly.

22. A system for allowing a user to float and glide for entertainment, the system comprising:
    an enclosed area;
    a device for allowing a user to float and glide within the enclosed area, where the device includes:
        an inflatable balloon having sufficient volume to carry a pilot aloft when it is inflated with a gas;
        a plurality of lines secured to one another at one end and operatively connected to the balloon;
        a ring attached to the plurality of lines; and
        a support mount rotationally attached to the ring, the support mount having mounted thereto:
            a) a propeller for propelling the device;
            b) a pedal assembly operatively connected to the propeller for enabling the user to drive the propeller;
            c) a steering assembly for enabling a user to steer the device; and
            d) at least one rudder and at least one elevator operatively connected to the steering assembly.

* * * * *